(12) United States Patent
Hou

(10) Patent No.: US 8,763,002 B2
(45) Date of Patent: Jun. 24, 2014

(54) METHOD, SYSTEM, AND APPARATUS FOR TASK ALLOCATION OF MULTI-CORE PROCESSOR

(75) Inventor: Zhongming Hou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 13/099,960

(22) Filed: May 3, 2011

(65) Prior Publication Data

US 2011/0219382 A1 Sep. 8, 2011

Related U.S. Application Data

(63) Continuation of application No. PCT/CN2009/071648, filed on May 5, 2009.

(30) Foreign Application Priority Data

Nov. 3, 2008 (CN) .......................... 2008 1 0225648

(51) Int. Cl.
*G06F 9/46* (2006.01)
*G06F 9/30* (2006.01)

(52) U.S. Cl.
USPC .......................................... 718/104; 712/220

(58) Field of Classification Search
None
See application file for complete search history.

(56) References Cited

U.S. PATENT DOCUMENTS

| 7,689,839 | B2 | 3/2010 | Uguen et al. | |
|---|---|---|---|---|
| 8,020,163 | B2 * | 9/2011 | Nollet et al. | 718/104 |
| 2003/0149716 | A1 | 8/2003 | Peterson | |
| 2004/0128563 | A1 | 7/2004 | Kaushik et al. | |
| 2004/0243866 | A1 | 12/2004 | Sherburne | |
| 2005/0228967 | A1 | 10/2005 | Hirairi | |
| 2006/0053326 | A1 | 3/2006 | Naveh et al. | |
| 2006/0080566 | A1 | 4/2006 | Sherburne | |
| 2006/0212677 | A1 | 9/2006 | Fossum | |
| 2007/0061433 | A1 * | 3/2007 | Reynolds et al. | 709/223 |
| 2007/0079150 | A1 | 4/2007 | Belmont et al. | |

(Continued)

FOREIGN PATENT DOCUMENTS

| CN | 1119749 C | 8/2003 |
|---|---|---|
| CN | 1732447 A | 2/2006 |

(Continued)

OTHER PUBLICATIONS

Office Action issued in corresponding Chinese Patent Application No. 200810225648.3, mailed Feb. 12, 2010.

(Continued)

*Primary Examiner* — Kenneth Tang
(74) *Attorney, Agent, or Firm* — Brinks Gilson & Lione

(57) ABSTRACT

A system for task allocation of a multi-core processor is provided. The system includes a task allocator and a plurality of sub-processing systems. Each of the sub-processing systems comprises a state register, a processor core, and a buffer, the state register is configured to recognize state of the sub-processing systems, and transmit state information of the sub-processing systems to the task allocator, the state information comprises: a first state bit configured to indicate whether sub-processing systems are in Idle state; and a second state bit configured to indicate a specific state of the sub-processing systems. The task allocator is configured to allocate task to the sub-processing systems according to a priority determined by the state information sent by the state registers of the sub-processing systems.

9 Claims, 5 Drawing Sheets

(56) References Cited

U.S. PATENT DOCUMENTS

| | | | |
|---|---|---|---|
| 2007/0094525 A1 | 4/2007 | Uguen et al. | |
| 2007/0220294 A1 | 9/2007 | Lippett | |
| 2007/0220517 A1 | 9/2007 | Lippett | |
| 2007/0294760 A1* | 12/2007 | Sood | 726/15 |
| 2009/0172683 A1* | 7/2009 | Lin et al. | 718/103 |
| 2009/0228693 A1* | 9/2009 | Koenck et al. | 712/248 |
| 2009/0288092 A1* | 11/2009 | Yamaoka | 718/104 |

FOREIGN PATENT DOCUMENTS

| | | |
|---|---|---|
| CN | 1834950 A | 9/2006 |
| CN | 1906587 A | 1/2007 |
| CN | 1955931 A | 5/2007 |
| CN | 101010655 A | 8/2007 |
| CN | 101154169 A | 4/2008 |
| CN | 101166099 A | 4/2008 |
| CN | 101231600 A | 7/2008 |
| CN | 101339523 A | 1/2009 |
| CN | 101403982 A | 4/2009 |
| CN | 101403982 B | 7/2011 |
| JP | 11167469 A | 6/1999 |

OTHER PUBLICATIONS

Written Opinion of the International Searching Authority issued in corresponding PCT Patent Application No. PCT/CN2009/071648, mailed Aug. 13, 2009.

International Search Report issued in corresponding PCT Patent Application No. PCT/CN2009/071648, mailed Aug. 13, 2009.

Author Unknown, "Title: Using C++ Language to Design the Extensible Thread Pool" Sep. 3, 2006.

Author Unknown, "Interpretation of Multi-Processing and Load Balancing Technology for Improving Server Performance" Nov. 11, 2001.

* cited by examiner

METHOD, SYSTEM, AND APPARATUS FOR TASK ALLOCATION OF MULTI-CORE PROCESSOR

CROSS-REFERENCE TO RELATED APPLICATIONS

This application is a continuation of International Application No. PCT/CN2009/071648, filed on May 5, 2009, which claims priority to Chinese Patent Application No. 200810225648.3, filed on Nov. 3, 2008, both of which are hereby incorporated by reference in their entireties.

FIELD OF THE TECHNOLOGY

The present invention relates to the field of communication technologies, and more particularly to a method, a system, and an apparatus for task allocation of a multi-core processor.

BACKGROUND OF THE INVENTION

In the design of a high-performance processor, improvement of performances of the processor implemented by just increasing a dominant frequency encounters bottlenecks. Currently, a mainstream trend is to design a processor with multiple cores. For example, a general processor for a Personal Computer (PC) is designed with dual cores, and a network processor is designed with tens of processor cores. In reality, tasks of the processor are always unbalanced in time domain, so that demands on the processing capability are also different. For example, when the network is busy, the full processing capability of the network processor may be required, but when the network is relatively idle, it is possible that the processing capability equivalent to only one or two processor cores is enough. The margin of the processing capability provides possible room for reducing power consumption of the processor. Considering the Low Power Design (LPD), some mature methods exist at the device level currently, such as, a method of stopping a clock signal of an idle device or a method of cutting off the voltage of the part.

In the prior art, when the processor is idle, the site is preserved, and then the whole processor enters the Sleep state. When a task is to be processed, the site is restored, and the processor is woken up to perform processing.

During the implementation of the present invention, the inventor finds that in the prior art, since the whole processor is in the Sleep state, no real-time data can be processed here. When a task is to be processed, the processor has to be woken up first, and then task information is sent, thus a task processing efficiency is affected.

SUMMARY OF THE INVENTION

In order to improve a task processing efficiency of a multi-core processor and implement a low power consumption of the multi-core processor without decreasing the capability of processing burst data or affecting system performances, embodiments of the present invention provide a method, a system, and an apparatus for task allocation of a multi-core processor. The technical solutions are described in the following.

In one aspect, the present invention provides a system for task allocation of a multi-core processor, comprising a task allocator and a plurality of sub-processing systems. Each of the sub-processing systems comprises a state register, a processor core and a buffer, the state register is configured to recognize state of the sub-processing systems, and transmit state information of the sub-processing systems to the task allocator, the state information comprises: a first state bit configured to indicate whether sub-processing systems are in Idle state, and a second state bit configured to indicate a specific state of the sub-processing systems, the specific state comprises Wait state, Sleep state, and Off state; and the task allocator is configured to allocate task to the sub-processing systems according to a priority determined by the state information sent by the state registers of the sub-processing systems.

In another aspect, the present invention further provides a system for task allocation of a multi-core processor, comprising a task allocator and a sub-processing system, wherein the sub-processing system comprises a processor core, a state register, a buffer and a path controller; the processor core is configured to process task packets allocated by the task allocator; the state register is configured to recognize state of the processor core; and the path controller is configured to receive task packets from the task allocator and determine the path for transmitting the task packets to the processor core of the sub-processing system according to the state of the processor core, wherein, if the processor core is idle, the path controller transmits the task packets to the processor core directly, and if the processor core is busy for task performance, the path controller transmits the task packets to the buffer to have the buffer transfer the task packet to the processor core.

In still another aspect, the present invention further provides a method for task allocation of a multi-core processor which comprises a plurality of sub-processing system. The method comprises: receiving state information of each of the sub-processing system, wherein the state information comprises: a first state bit configured to indicate whether sub-processing systems are in Idle state, and a second state bit configured to indicate a specific state of the sub-processing systems, the specific state comprises Wait state, Sleep state, and Off state; determining priorities for allocating task to the plurality of the sub-processing system; allocating task for the plurality of the sub-processing system according to the priorities.

Further, another method for task allocation of a multi-core processor which comprises a processor core configured to process task packets, and a buffer is also provided. The method comprises: a path controller receiving task packets from a task allocator; the path controller receiving state information about the processor core, and determining a transmitting path for transmitting the task packets to the processor core, wherein, if the processor core is idle, the path controller transmits the task packets to the processor core directly; and if the processor core is busy for task performance, the path controller transmits the task packets to the buffer to have the buffer transfer the task packet to the processor core.

Beneficial effects of the technical solutions provided in the present invention are described in the following.

Configuration can be done flexibly according to application scenarios and data traffic, so that the task processing efficiency of the multi-core processor is improved, and the low power consumption is implemented without affecting the system performances. On and off states of the processor cores are shielded, so that from the perspective of the task allocator, all the processor cores are available, thereby ensuring the low power consumption without decreasing the capability of processing burst data.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution of the present invention will be clearly described in the following with reference to the accompanying drawings. It is obvious that the embodiments to be described are only a part of rather than all of the embodiments of the present invention. All other embodiments obtained by persons skilled in the art based on the embodiments of the present invention without creative efforts shall fall within the protection scope of the present invention.

In order to improve a task processing efficiency of a multi-core processor and implement a low power consumption of the multi-core processor without decreasing the capability of processing burst data and or affecting system performances, the present invention provides a method, a system, and an apparatus for task allocation of a multi-core processor. The technical solutions provided in the present invention are described in detail in the following embodiments.

Embodiment 1

Figure 1:
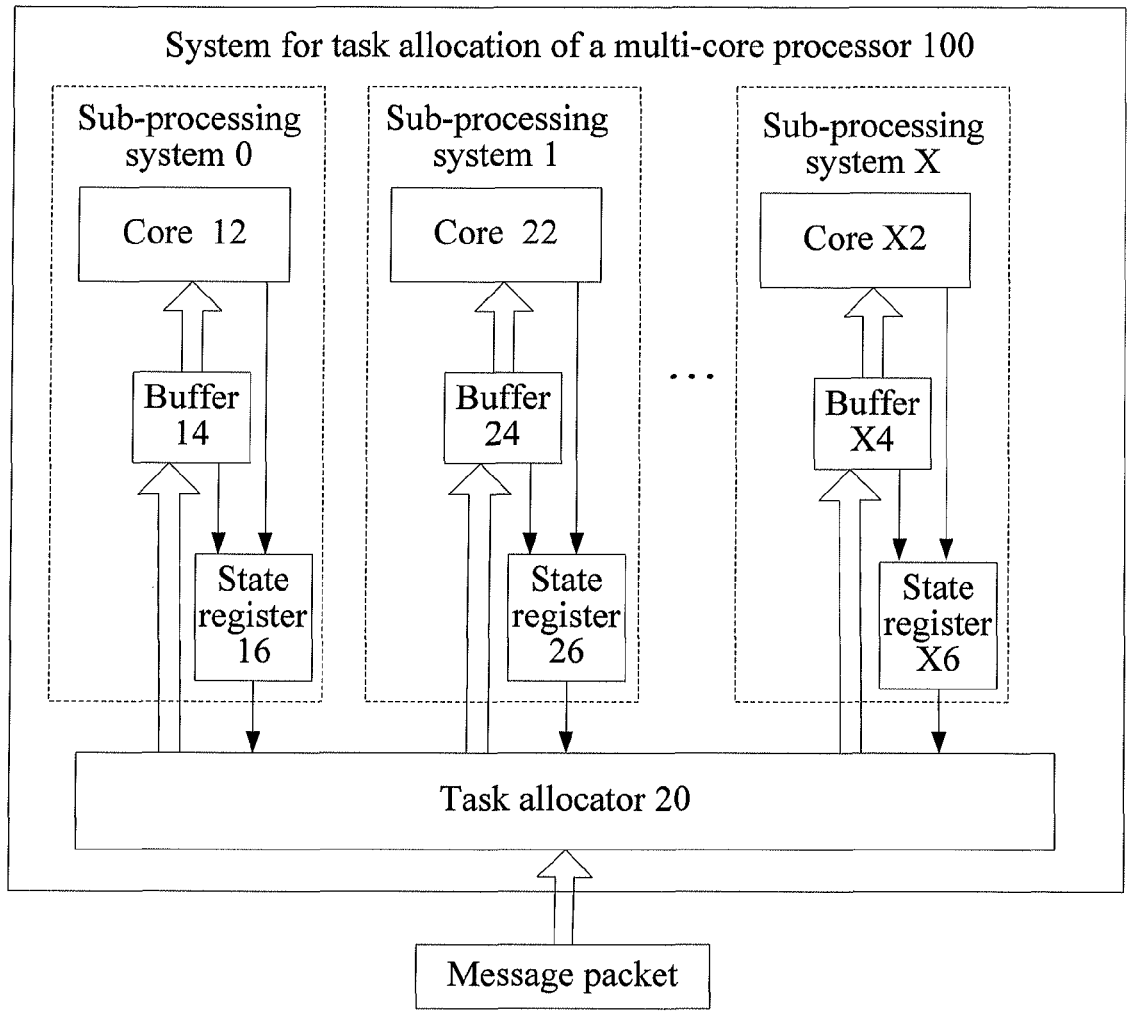
FIG. 1 is a schematic view of a system for task allocation of a multi-core processor according to a first embodiment of the present invention.

Referring to FIG. 1, the present invention provides a system for task allocation of a multi-core processor 100. The system for task allocation of the multi-core processor 100 includes a task allocator 20 and a plurality of sub-processing systems 0 to X.

The description is given in the following by taking the sub-processing system 0 as an example. The sub-processing system 0 includes a processor core 12, a buffer 14, and a state register 16. An input end of the buffer 14 is connected to the task allocator 20, and an output end of the buffer 14 is connected to the processor core 12, so as to receive task information from the task allocator 20 and send the task information to the processor core 12. The state register 16 is connected to the buffer 14 and the processor core 12, so as to feed back states of the processor core 12 and the buffer 14 to the task allocator 20.

In practical applications, the task allocator 20 distributes tasks to a plurality of sub-processing systems 0 to X according to judgment results reflected by the state registers in the system for task allocation of the multi-core processor 100.

In practical applications, the state register 16 keeps monitoring the states of the processor core 12 and the buffer 14. In the present invention, when the processor core 12 is processing a task or task information is stored in the buffer 14, the state register 16 feeds back information indicating that the sub-processing system 0 is in the Busy state to the task allocator 20. When the processor core 12 is in the Wait state, the Sleep state, or the Off state, and no task information is stored in the buffer 14, the state register 16 feeds back information indicating that the sub-processing system 0 is in the Idle state to the task allocator 20.

In practical applications, the information that the state register 16 feeds back to the task allocator 20 may include a first state bit, configured to indicate whether the sub-processing systems 0 is in the Idle state.

Furthermore, the information that the state register 16 feeds back to the task allocator 20 may also include a second state bit, configured to indicate a current state of the sub-processing system 0, that is, a specific state of the sub-processing system 0 in the Idle state, such as the Wait state, the Sleep state, or the Off state. When a task needs to be allocated, the sub-processing system in the Wait state has a higher priority than the sub-processing system in the Sleep state, and the sub-processing systems in the Sleep state has a higher priority than the sub-processing systems in the Off state, so that when a plurality of sub-processing systems is in the Idle state, the task allocator 20 may preferentially allocate the task to the sub-processing system in the Wait state, thereby avoiding the power consumption and the reducing of the efficiency caused by waking up the sub-processing systems in the Sleep state or the Off state.

Furthermore, when the processor core 12 of the sub-processing system is a multi-threaded processor core, the information that the state register 16 feeds back to the task allocator 20 may also include a third state bit, configured to indicate an idle degree of the processor core 12, such as a number of idle threads, and the task allocator 20 preferentially allocates the task to the processor core 12 with the higher idle degree. It is easily understood that when a part of sub-processing systems are set into the Sleep state or the Off state due to the demand of reducing the power consumption, here the active cores are reduced, so that if a total number of the tasks remains unchanged, the tasks averagely allocated to each remaining core are increased, therefore the state register corresponding to the active core shows that the idle degree is low. However, as long as the processor core of the active sub-processing system still has an idle thread, the sub-processing system in the Sleep state or the Off state is not woken up, so that an operation power consumption of the system is lowered.

In the present invention, the buffer 14 may also be implemented in a manner of First In First Out (FIFO). In other alternative embodiments, buffers of other forms may also be adopted without affecting the implementation of the present invention.

The system for task allocation of the multi-core processor 100 according to the present invention judges the state of the sub-processing system through the state register 16. If a task needs to be allocated and all the sub-processing systems in the active state are busy, the task allocator 20 learns through the state register 16 of the sub-processing system in the Sleep state or the Off state that the sub-processing system in the Sleep state or the Off state can process the task, so that the task allocator 20 may store the task in the buffers 14 firstly, and then wake up the processor core 12 of the sub-processing system in the Sleep state or the Off state, thereby improving the task processing efficiency.

In the present invention, the buffer 14 may be configured to wake up the corresponding processor core 12.

The present invention makes good use of structural characteristics of the multi-core processor and uses the buffers and the state registers. When the processor cores are in the Sleep state or the Off state, the task allocator may also allocate tasks to the processor cores, so that after being woken up, the processor cores may process the tasks timely, thereby improving the task processing efficiency.

Figure 2:
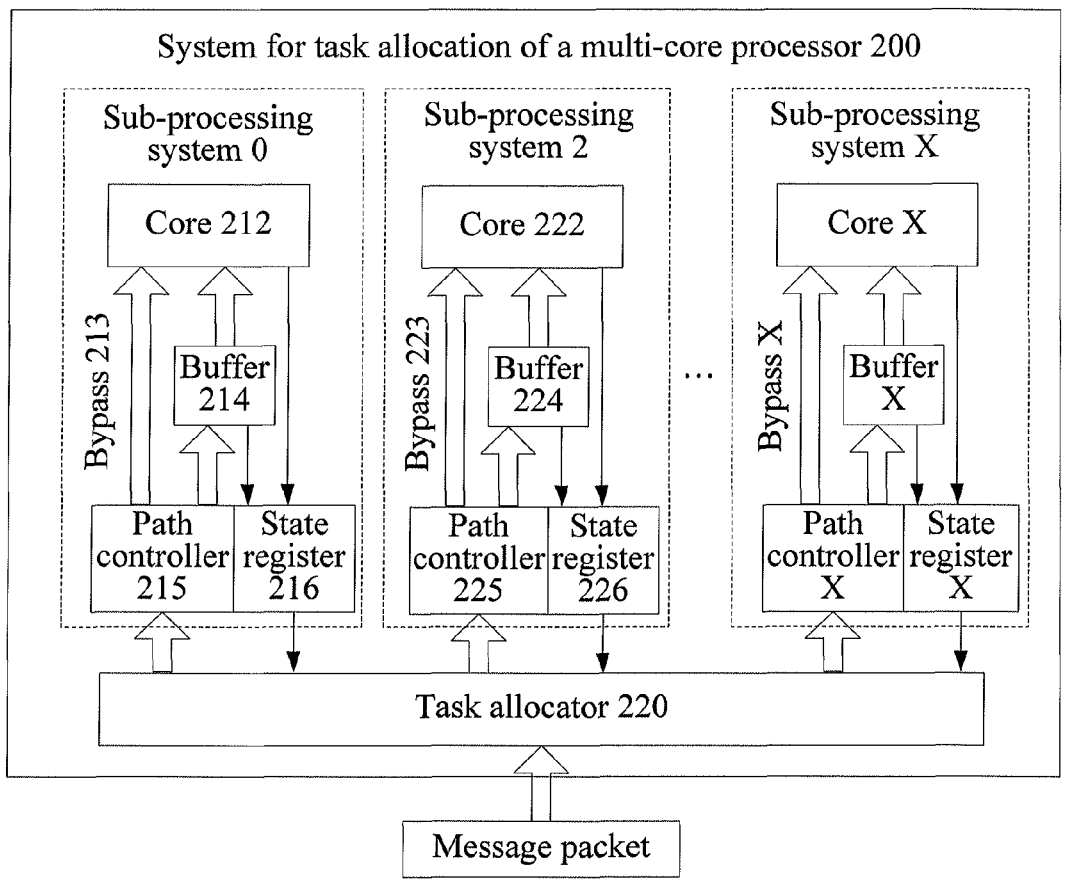
FIG. 2 is a schematic view of another system for task allocation of a multi-core processor according to the first embodiment of the present invention.
Figure 3:
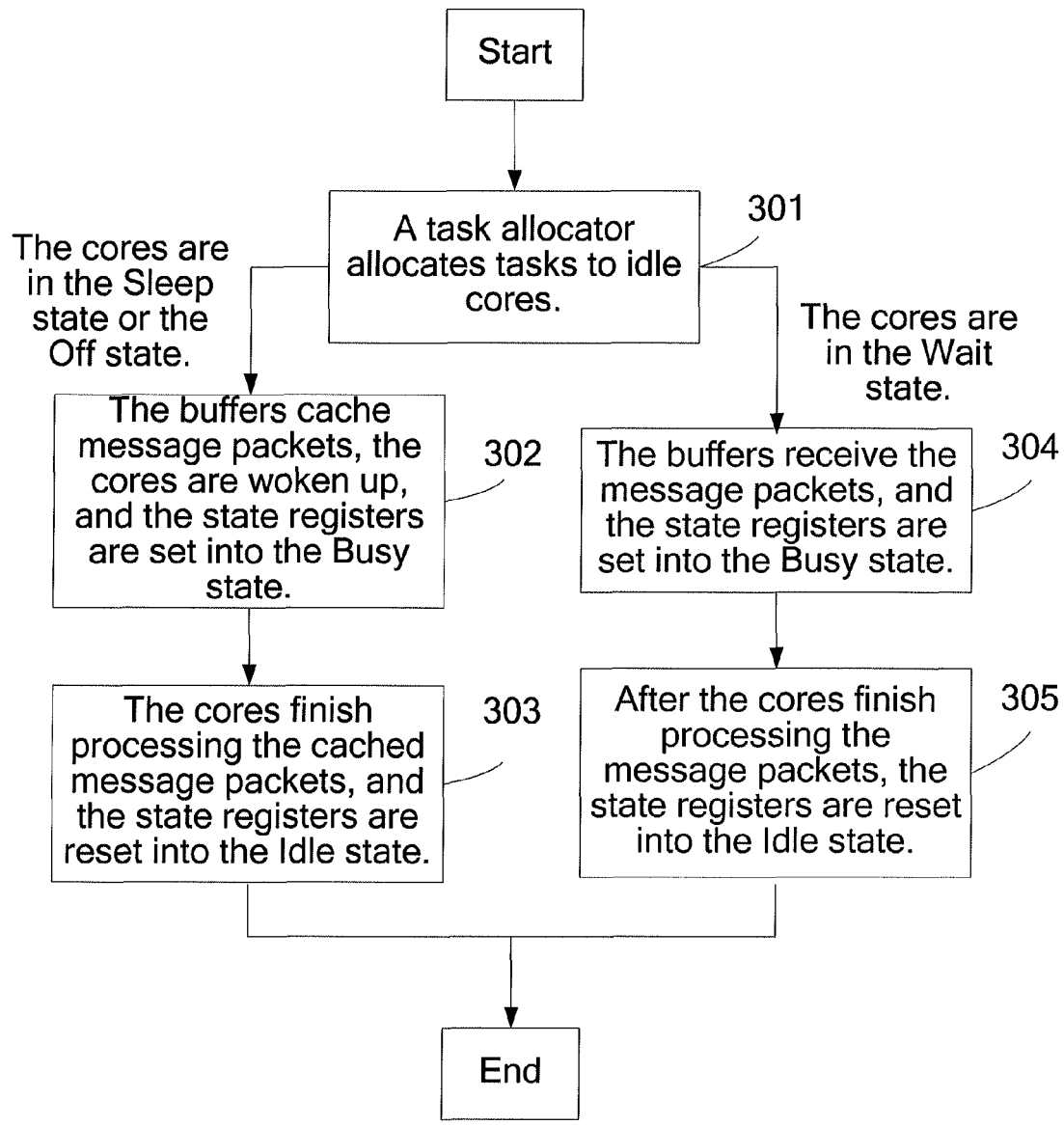
FIG. 3 is a flow chart of a method for task allocation of a multi-core processor according to a second embodiment of the present invention.

Referring to FIG. 2, the present invention further provides another system for task allocation of a multi-core processor 200. The same parts between the system for task allocation of the multi-core processor 200 and the system for task allocation of the multi-core processor 100 according to the present invention are not described. A difference between the system for task allocation of the multi-core processor 200 of this embodiment and the system for task allocation of the multi-core processor 100 in the previous embodiment is that each sub-processing system further includes a bypass 213 and a path controller 215, where the path controller 215 is connected to a task allocator 220 and receives task information sent by the task allocator 220, the path controller 215 selects a transmission channel for the task information according to state information stored in a state register 216. Specifically, when the processor core 212 waiting for receiving the task is processing data, that is, the processor core 212 is in the Busy state, the path controller 215 selects a buffer 214 as a path for sending the task information. When the processor core 212 is in the Wait state, the path controller 215 selects the bypass 213 as the path for sending the task information, and the bypass 213 may directly send the received task information to the processor core 212 in the Wait state, so as to accelerate the processing of the task information. When the processor core 212 is in the Sleep state or the Off state, the path controller 215 sends the task information through the buffer 214, the buffer 214 receives and caches the task information, while the processor core 212 in the Sleep state or the Off state is woken up, and after the processor core 212 is woken up, the buffer 214 sends the cached task information to the processor core 212.

The system according to the present invention can be configured flexibly according to application scenarios and data traffic by setting the state registers and the transmission channels, thereby improving the task processing efficiency of the multi-core processor, and realizing the low power consumption without affecting the system performances. The on and off states of the processor cores are shielded, and from the perspective of the task allocator, all the processor cores are available, thereby ensuring the low power consumption without decreasing the capability of processing burst data.

Embodiment 2

The present invention provides a method for task allocation of a multi-core processor, which includes the following steps.

Firstly, a task allocator judges whether processor cores are idle according to states of state registers.

Then message packets are transmitted to the idle processor cores through transmission channels.

The method for task allocation of the multi-core processor according to the present invention is described in the following with reference to the accompanying drawing. The present invention provides the method for task allocation of the multi-core processor, and description is given by taking the transmission channel set between the task allocator and the processor core being a buffer as an example.

In step 301, the task allocator searches for the idle processor cores according to the Busy-Idle states of the state registers corresponding to the processor cores, and sends the message packets to the idle processor cores through the buffers for being processed. If the idle processor core is in the Sleep state or the Off state, step 302 is performed. If the idle processor core is in the Wait state, step 304 is performed.

Specifically, for a multi-threaded processor core, the state register needs to be set according to states of internal threads. Taking an 8-thread processor core as an example, a processor core can process 8 tasks at the utmost at the same time. The weight ranging from 0 to 8 is configured to indicate the Busy-Idle state of the processor core. If all the 8 threads are idle, a third state bit of the state register is 8. If 3 threads are occupied and 5 threads are idle, the third state bit of the state register is 5. In order to avoid resource competition, usually the task allocator preferentially allocates the task to the processor core having the state register with a high idle degree. For a multi-threaded processor core, only when all the internal threads are idle, the processor core can be turned off. When the task allocator allocates the tasks among active cores, in order to reach a point balanced between efficient and power consumption, according to the processing capability of the processor cores, it can be set in the following. When a ratio of idle threads in the active processor cores is higher than an off threshold value, a processor core is turned off, and the core is set into an inactive state. After all the internal threads finish processing, the operation stops automatically, and among all the working processor cores, the tasks are allocated preferentially to the processor cores that are still processing tasks and have the high idle degree.

In step 302, when the processor cores are in the Sleep state or the Off state, the message packets sent by the task allocator to the processor cores are stored in the buffers temporarily. At the same time, the processor cores are woken up, and the state registers are set into the Busy state.

When the processor cores are in the Sleep state, a power consumption of the whole system is lowered, the processor cores in the Sleep state can be woken up immediately, and a caching pressure of the buffers is relatively low. When the processor core is in the inactive state, the processor core can also be turned off by cutting off a power of the single processor core, so that the power can be saved, but switching time required during waking is relatively, and the required cache is bigger, so the manner of implementing the low power consumption is determined according to application scenarios.

In step 303, after the processor cores are woken up and after the message packets temporarily stored in the buffers are processed, the state registers are reset into the Idle state, and the process ends.

After the state registers are reset into the Idle state, from the perspective of the task allocator, the processor cores are again in the state in which the tasks can be allocated.

In step 304, when the processor cores are in the Wait state, the buffers receive the message packets sent by the task allocator and directly transmit the received message packets to the processor cores for being processed. At the same time, the state registers are set into the Busy state.

Because the processor cores are in the Wait state, the message packets transmitted through the buffers can be processed directly without waiting. Here, the processor cores can process the message packets being received, but do not receive new message packets.

In step 305, after processing the message packets, the processor cores return to the Wait state, the state registers are reset into the Idle state, and the process ends.

After the state registers are reset into the Idle state, from the perspective of the task allocator, the processor cores are again in the state in which the tasks can be allocated.

In the present invention, the multi-core processor performs dynamic switching through the Busy-Idle states of the state registers, and the on and off states of the processor cores are shielded from affecting the task allocator during the task allocation. Although the processor cores are in the Off state, from the perspective of the task allocator, the processor cores in the Off state are still available, and all the processor cores are available, thereby ensuring the low power consumption without decreasing the capability of processing burst data.

Embodiment 3

Figure 4:
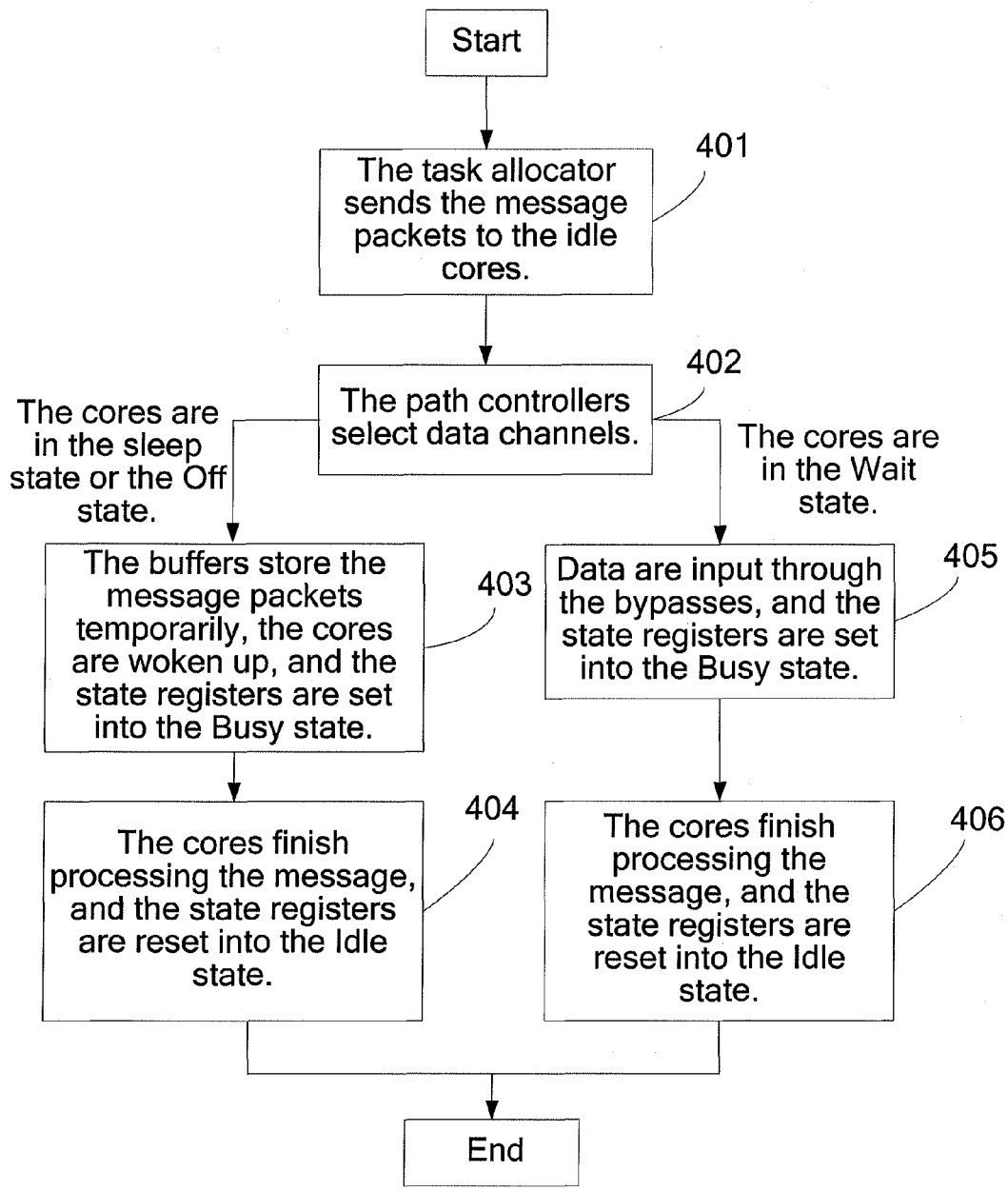
FIG. 4 is a flow chart of a method for task allocation of a multi-core processor according to a third embodiment of the present invention.

The present invention further provides a method for task allocation of a multi-core processor. Description is given by taking transmission channels set between a task allocator and a processor core being a bypass and a buffer as an example. Referring to FIG. 4, the method includes the following steps.

In step 401, the task allocator searches for the idle processor cores according to Busy-Idle states shown by the state registers corresponding to the processor cores, and sends received message packets to the idle processor cores for being processed.

If the processor core is a single-thread processor core, the Idle state or the Busy state of the state register is defined according to specific demands. For example, the Busy-Idle state of the single-thread processor core is defined according to whether the single-thread processor core is processing data. If the processor core is processing a task, or a task is stored in the buffer, the processor core is in the Busy state; on the contrary, if the processor core is not processing the task, and no task exists in the buffer, the processor core is in the Idle state. More specifically, the Idle state includes three cases in which the processor core is in a waiting state for processing a task, in the Sleep state, and in the Off state. When finding that a plurality of cores are in the Idle state, the task allocator can randomly select an idle core, or select an idle core from the idle cores according to a preset optimal selection algorithm, and specific selection manners and methods are not limited to the present invention.

When the processor core is a multi-threaded processor core, the state register needs to be set according to states of internal threads. Taking an 8-thread processor core as an example, a processor core can process 8 tasks at the utmost at the same time. The weight ranging from 0 to 8 is configured to indicate the Busy-Idle state of the processor core. If all the 8 threads are idle, a third state bit of the state register is 8. If 3 threads are occupied and 5 threads are idle, the third state bit of the state register is 5. In order to avoid resource competition, usually the task allocator preferentially allocates the task to the processor core having the state register with a high idle degree. For a multi-threaded processor core, only when all the internal threads are idle, the processor core can be turned off. The multi-threaded processor cores can be divided into two states being Active and Inactive according to the state of the multi-threaded processor core, the task allocator only allocates the tasks among active cores, here, in order to reach a point balanced between efficient and power consumption, according to the processing capability of the processor cores, it can be set in the following. When the idle threads in the active processor core are higher than an off threshold value, a processor core is turned off, and the core is set into an inactive state. After all the internal threads finish processing, the operation stops automatically. Among all the working processor cores, the tasks are allocated preferentially to the processor cores that are still processing tasks and have the high idle degree. That is to say, when the processor cores in the multi-core processor are multi-threaded processor cores, the idle degree is set according to the number of the idle threads in the multiple threads. The state register of each multi-threaded processor core sets the state value according to the idle degree. Accordingly, the task allocator preferentially selects the multi-threaded processor cores with the biggest number of the idle threads among the active cores according to the idle degree for allocation.

The core state of the processor is specifically described in the following.

(1) For the single-thread cores, it is default that the tasks can be allocated to all the cores by the task allocator, and it is known by the allocator whether the cores are turned off for reducing the power consumption. Therefore, in this case, only the Idle state (including the Wait state, the Sleep state and the Off state) and the Busy state exist.

(2) For the multi-threaded cores, the management is more complex. When the idle threads in a core are higher than the off threshold value, a processor core is turned off, and the core is set into the Inactive state. After all the internal threads finish processing, the operation stops automatically, and only when all the threads are idle, the core can be turned off. Therefore, if the tasks are allocated to all the cores by the task allocator, all the cores work, but an average number of the working threads in each core is smaller, which is not reasonable from the perspective of reducing the power consumption. An algorithm is required to ensure that the number of the working cores is smaller and the average number of the working threads in each core is larger, and at the same time, when a certain core needs to be turned off, a mechanism is required to ensure that no task is allocated to any of the internal threads of the core any more. Therefore, the multi-threaded cores are divided into the Active state and the Inactive state, the Idle state and the Busy state are only valid among the active cores, whether the active cores are turned off inside is also known by the task allocator, and the task allocator only allocates tasks among the active cores. The inactive cores may also be regarded as being in the Busy state all the time, but the inactive cores actually do not take part in processing, and the task allocator does not allocate the tasks to them either.

In step 402, after receiving the message packets sent by the task allocator, a path controller corresponding to the idle processor core selects a channel for transmitting the message packets according to the Idle state of the processor core. If the processor core is in the Sleep state or the Off state, step 403 is performed, and if the processor core is in the Wait state, step 405 is performed.

As described in the foregoing, the Idle state of the processor cores may be the Wait state, the Sleep state, or the Off state according to length of idle time. When not processing the data, the processor core switches from the Busy state to the Idle state. Specifically, the processor core firstly enters the Wait state, and after duration of the Wait state reaches a set time value, the processor core switches from the Wait state to the Sleep state or the Off state, thereby reducing the power consumption.

In step 403, when the processor cores are in the Sleep state or in the Off state, the buffers are selected to transmit the message packets, where the transmitted message packets are cached by the buffers, at the same time the processor cores are woken up, and the state registers are set into the Busy state.

When the processor cores are idle, the low power consumption can be implemented by turning off the clock, in this manner, the switching and waking speed is quick; or the low power consumption can be implemented by cutting off the power source of a single processor core respectively, in this manner, the power is saved, and the power consumption is lowered, but it takes longer time to switch and wake, and the required cache is bigger. For example, when the demands on the power consumption is high, the manner of cutting off the power source of the single processor core respectively may be adopted, but when the demands on the switching and waking time is high, the first manner of turning off the clock may be adopted, where the specifically adopted manner for implementing the low power consumption is determined according to specific application scenarios.

In step 404, after the processor cores are woken up, and after the message packets temporarily stored in the buffers are processed, input channels are switched to the bypasses, the state registers are reset into the Idle state, and then the process ends.

After the state registers are reset into the Idle state, from the perspective of the task allocator, the processor cores are again in the state in which the tasks can be allocated.

In step 405, when the processor cores are in the Wait state, the bypasses are selected to transmit the message packets. The bypasses start to receive the message packets sent by the task allocator. The state registers are set into the Busy state. The current processor cores can process the message packets being received, but do not receive new message packets.

When the processor cores are in the Wait state, the bypasses are selected to transmit the message packets. The message packets are directly transmitted to the processor cores in the Wait state, so that the processor cores in the Wait state can directly process the message packets transmitted by the bypasses, and here it is not necessary to wait for the processing procedure of the message packets, thereby reducing the power consumption and a time delay of transmitting the message packets.

In step 406, after processing the message packets transmitted by the bypasses, the processor cores enter the Wait state. The state registers are reset into the Idle state, and then the process ends.

After the state registers are reset into the Idle state, from the perspective of the task allocator, the processor cores are again in the state in which the tasks can be allocated.

In the present invention, the multi-core processor performs dynamic switching through the Busy-Idle states of the state registers. The task allocator allocates the tasks to the cores according to the states of the state registers. The message packets are transmitted according to the selected transmission channels (the buffers or the bypasses). Although the multi-core processor is in the Off state, from the perspective of the task allocator, the turned off multi-core processor is still in the state in which the tasks can be allocated, thereby ensuring the low power consumption without decreasing the capability of processing burst data.

Embodiment 4

Figure 5:
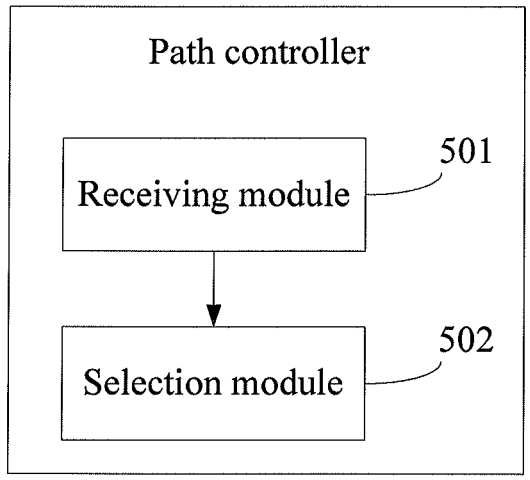
FIG. 5 is a schematic structural view of a path controller according to a fourth embodiment of the present invention.

Referring to FIG. 5, the present invention provides a path controller, which includes a receiving module 501 and a selection module 502.

The selection module 501 is configured to receive message packets sent by a task allocator.

The selection module 502 is configured to select a transmission channel to transmit the message packets.

When the transmission channel includes a bypass and a buffer, the selection module 502 specifically includes a first selection unit and a second selection unit.

The first selection unit is configured to select the bypass as the transmission channel when an idle processor core is in the Wait state, and end the received message packets to the bypass.

The second selection unit is configured to select the buffer as the transmission channel when the idle processor core is in the Sleep state or the Off state, and send the received message packets to the buffer.

Through the path controller according to the present invention, the transmission channel may be selected, and the message packets are transmitted according to the selected transmission channel, so that a task processing efficiency of a multi-core processor is improved, and a low power consumption of the multi-core processor is implemented without decreasing the capability of processing burst data or affecting system performances.

Embodiment 5

Figure 6:
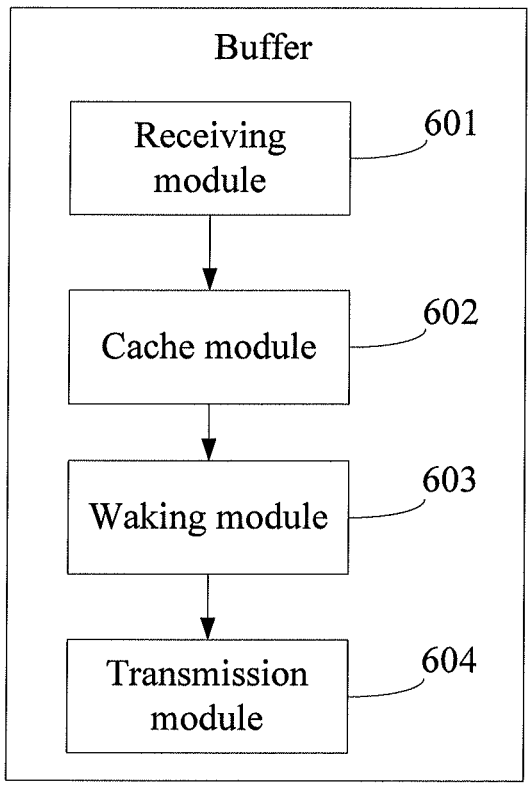
FIG. 6 is a schematic structural view of a buffer according to a fifth embodiment of the present invention.

Referring to FIG. 6, the present invention provides a buffer, which includes a receiving module 601, a cache module 602, a waking module 603, and a transmission module 604.

The receiving module 601 is configured to receive message packets transmitted by a path controller.

The cache module 602 is configured to cache the message packets received by the receiving module 601.

The waking module 603 is configured to wake up a processor core in the Sleep state or the Off state.

The transmission module 604 is configured to transmit the message packets cached by the cache module 602 to the woken-up processor core after the waking module 603 wakes up the processor core.

Furthermore, when the processor core is in the Idle state, the transmission module 604 is also configured to directly send the message packets received by the receiving module 601 to the processor core in the Idle state.

Through the buffer according to the present invention, the received message packets are cached and the processor core is woken up, when the processor core is in the Sleep state or the Off state, and after the processor core is woken up, the cached message packets are sent, so that a task processing efficiency of a multi-core processor is improved, and a low power consumption of the multi-core processor is implemented without decreasing the capability of processing burst data or affecting system performances.

Through the above description of the implementation, it is clear to persons skilled in the art that the present invention may be accomplished through hardware, or through software plus a necessary universal hardware platform. Based on this, the technical solutions of the present invention may be embodied in the form of a software product. The software product may be stored in one or more nonvolatile storage media (for example, CD-ROM, USB flash drive, or removable hard disk) and contain several instructions configured to instruct computer equipment (for example, a personal computer, a server, or network equipment) to perform the method according to the embodiments of the present invention.

The above descriptions are merely some exemplary embodiments of the present invention, but are not intended to limit the present invention. Any modification, equivalent replacement, or improvement made without departing from the spirit and principle of the present invention should fall within the scope of the present invention.

What is claimed is:

1. A system for task allocation of a multi-core processor, comprising a task allocator and a plurality of sub-processing systems, wherein each of the sub-processing systems comprises a state register, a processor core and a buffer, the state register is configured to recognize a state of the sub-processing systems, and transmit state information of the sub-processing systems to the task allocator, the state information comprises: a first state bit configured to indicate whether sub-processing systems are in an Idle state, and a second state bit configured to indicate a specific state of the sub-processing systems, the specific state comprises a Wait state, Sleep state, and Off state, wherein the Idle state comprises the Wait state, Sleep state or Off state; and the task allocator is configured to allocate task to the sub-processing systems according to a priority determined by the state information sent by the state registers of the sub-processing systems;

Wherein, the each of the sub-processing systems further comprises a path controller configured to receive task packets from the task allocator and determine a path for transmitting the task packets to the processor core according to the state of the processor core, wherein, if the state of the processor core is wait, the path controller transmits the task packets to the processor core directly, and if the state of the processor is sleep or off, the path controller transmits the task packets to the buffer to have the buffer transfer the task packets to the processor core.

2. The system for task allocation of a multi-core processor according to claim 1, wherein when the sub-processing systems are in the Idle state, the priority for allocating task to a sub-processing system in the Wait state is higher than the priority for allocating task to a sub-processing system in the Sleep state, and the priority for allocating task to a sub-processing system in the Sleep state is higher than the priority for allocating task to a sub-processing system in the Off state.

3. The system for task allocation of a multi-core processor according to claim 1, wherein the state information further comprises a third state bit configured to indicate an idle degree of sub-processing systems, and when the sub-processing systems are not idle, the task allocator is configured to allocate task according to the third state bit of the state information of the sub-processing system.

4. The system for task allocation of a multi-core processor according to claim 3, wherein the idle degree is determined according to the information about the number of the idle threads of the sub-processing systems.

5. A method for task allocation of a multi-core processor which comprises a plurality of sub-processing systems, comprising:

receiving state information of each of the sub-processing systems, wherein the state information comprises: a first state bit configured to indicate whether the sub-processing systems are in Idle state, and a second state bit configured to indicate a specific state of the sub-processing systems, the specific state comprises a Wait state, Sleep state, and Off state, wherein the Idle state comprises the Wait state, Sleep state or Off state, wherein each of the sub-processing systems comprises a path controller, a processor core and a buffer;

allocating task for a sub-processing systems in the Idle state, wherein, if the sub-processor system is in the Wait state, transmitting the task to the path controller to have the path controller transfer the task to the processor core directly; and if the sub-processor system state is in the Sleep state or Off state, transmitting the task to the path controller to have the path controller transfer the task to the buffer.

6. The method for task allocation of a multi-core processor according to claim 5, wherein when the sub-processing systems are in the Idle state, the priority for allocating task to a sub-processing system in the Wait state is higher than the priority for allocating task to a sub-processing system in the Sleep state, and the priority for allocating task to a sub-processing system in the Sleep state is higher than the priority for allocating task to a sub-processing system in the Off state.

7. The method for task allocation of a multi-core processor according to claim 5, wherein the state information further comprises a third state bit configured to indicate an idle degree of the sub-processing systems, and when the sub-processing systems are not idle, the task allocator is configured to allocate task according to the third state bit of the state information of the sub-processing system.

8. A method for task allocation of a multi-core processor which comprises a processor core configured to process task packets, and a buffer, comprising:

a path controller receiving task packets from a task allocator;

the path controller receiving state information about the processor core, wherein the state information comprises: a first state bit configured to indicate whether the processor core is in an Idle state, and a second state bit configured to indicate a specific state of the processor core, the specific state comprises a Wait state, Sleep state, and Off state, and the Idle state comprises the Wait state, Sleep state or Off state, and determining a transmitting path for transmitting the task packets to the processor core, wherein, if the processor core is in a Wait state, the path controller transmits the task packets to the processor core directly; and if the processor core is sleep or off, the path controller transmits the task packets to the buffer to have the buffer transfer the task packet to the processor core.

9. A sub-processing system comprising a processor core configured to process task packets, a state register, a buffer, and a path controller:

the state register is configured to recognize state of the processor core;

the path controller is configured to receive task packets form a task allocator, receive state information about the processor core, wherein the state information comprises: a first state bit configured to indicate whether the processor core is in an Idle state, and a second state bit configured to indicate a specific state of the processor core, the specific state comprises a Wait state, Sleep state, and Off state, and the Idle state comprises the Wait state, Sleep state or Off state, and determine a transmitting path for transmitting the task packets to the processor core, wherein, if the processor core is in a Wait state, the path controller transmits the task packets to the processor core directly; and if the processor core is sleep or off, the path controller transmits the task packets to the buffer to have the buffer transfer the task packet to the processor core.

* * * * *